(12) United States Patent
Nordenfelt et al.

(10) Patent No.: US 8,330,942 B2
(45) Date of Patent: Dec. 11, 2012

(54) METHODS AND INSTRUMENTS FOR ESTIMATING TARGET MOTION

(75) Inventors: Mikael Nordenfelt, Taby (SE); Thomas Klang, Åkersberga (SE)

(73) Assignee: Trimble AB, Daneryd (SE)

( * ) Notice: Subject to any disclaimer, the term of this patent is extended or adjusted under 35 U.S.C. 154(b) by 224 days.

(21) Appl. No.: 12/450,013

(22) PCT Filed: Mar. 8, 2007

(86) PCT No.: PCT/EP2007/002009
§ 371 (c)(1),
(2), (4) Date: Feb. 18, 2010

(87) PCT Pub. No.: WO2008/106999
PCT Pub. Date: Sep. 12, 2008

(65) Prior Publication Data
US 2010/0149518 A1   Jun. 17, 2010

(51) Int. Cl.
*G01C 3/08* (2006.01)
(52) U.S. Cl. ......... 356/4.01; 356/3.01; 356/3.1; 356/4.1
(58) Field of Classification Search ............... 356/4.01, 356/27, 318; 250/203.1
See application file for complete search history.

(56) References Cited

U.S. PATENT DOCUMENTS

| 4,825,055 | A | * | 4/1989 | Pollock ........................ 235/411 |
| 4,845,500 | A | | 7/1989 | Cornett et al. |
| 5,422,829 | A | | 6/1995 | Pollock |
| 5,600,561 | A | * | 2/1997 | Okamura ....................... 701/300 |
| 6,064,333 | A | * | 5/2000 | Stromberg ..................... 342/81 |
| 6,265,704 | B1 | * | 7/2001 | Livingston .................. 250/203.2 |
| 6,611,755 | B1 | | 8/2003 | Coffee et al. |
| 7,555,383 | B2 | * | 6/2009 | Siegel ........................... 701/207 |
| 2004/0233414 | A1 | | 11/2004 | Jamieson et al. |
| 2005/0264438 | A1 | | 12/2005 | Fullerton et al. |
| 2008/0100822 | A1 | * | 5/2008 | Munro ........................ 356/4.01 |

FOREIGN PATENT DOCUMENTS

DE   3708313   * 9/1988
FR   2 612 299   9/1988

OTHER PUBLICATIONS

International Preliminary Examination Report dated Aug. 3, 2007 issued in corresponding Application No. PCT/EP2007/002009.
Office Action dated Jul. 22, 2011 issued in corresponding Chinese Application No. 200780052080.3.

(Continued)

*Primary Examiner* — Luke Ratcliffe
(74) *Attorney, Agent, or Firm* — Harness, Dickey & Pierce, P.L.C.

(57) ABSTRACT

The present invention relates to a measuring instrument and methods for such a measuring instrument for tracking a moving object, measuring a distance to an object. According to the invention, sets of target position data including at least horizontal (Ha) and vertical angle (Va) between the measuring instrument (1) and said at least one target (9) in consecutive measurements during a measurement session are obtained (40; 50; 60; 70); a model describing a path of and/or a distance to the target (9) is calculated; at least a present position of the target is estimated (44; 53; 65; 74) using the model; and, the estimated position of the target (9) is used (45; 56; 67; 79) when searching for the target (9).

23 Claims, 7 Drawing Sheets

OTHER PUBLICATIONS

Office Action dated Aug. 12, 2010 issued in corresponding European Application No. 07723104.1
Chinese Office Action dated Jan. 30, 2012 for corresponding Chinese Application No. 200780052080.3 (full English translation provided).

Bei Jiaxiang et al., "Microcomputer Real-Time Kalman Filtering Process to Radar Network System Data", Journal of Shenyang Polytechnic University, vol. 11 No. 3, Sep. 1989.

* cited by examiner

METHODS AND INSTRUMENTS FOR ESTIMATING TARGET MOTION

FIELD OF THE INVENTION

The present invention generally relates to methods for determining the position of moving objects such as a vehicle using a position-determining apparatus such as a surveying unit. The present invention particularly concerns a measuring instrument and methods for such a measuring instrument for tracking a moving object, measuring a distance to an object.

BACKGROUND

The art of surveying involves the determination of unknown positions, surfaces or volumes of objects or setting out of known coordinates using angle and distance measurements taken from one or more positions. In order to make these measurements, a surveying device frequently used is a distance measuring instrument with an integrated distance and angular measurement of the type which is called a total station, i.e. with combined electronic, optical and computer techniques. A total station is furthermore provided with a computer or control unit with writable information for measurements to be performed and for storing data obtained during the measurements. Preferably, the total station calculates the position of a target in a fixed ground-based coordinate system. In, for example, WO 2004/057269 by the same applicant, such a total station is described in more detail.

When performing distance measuring or surveying tasks using a distance measuring total station at a work site, naval work site, a construction work site or a mining work site, it is often desirable to track a moving object or measure the distance to an object.

The tracker system of an optical total station normally focuses a light signal from a target located at an object, either a reflection of an incident measuring beam from the target or from an active device on the target, onto a detector. A servo system of the total station moves or turns the station in according to the signal from the sensor.

Thus, the tracker system will only have a limited angle of view and in order to locate or track the target, the tracker system will have to be pointed in a direction close to the target. When the servo system has pointed the total station towards the target, it will be able to "lock onto" the target, which means, inter alia, that the total station can follow or track the targets motion.

This narrow angle of view entails problem, for example, when the target is temporarily lost, i.e. the reflecting signal is lost, when the target for instance is hidden behind an obstacle when the object moves behind the obstacle. In order to regain the lock of the target when the target reappears, the total station needs to estimate the movement of the target, i.e. the object, behind the obstacle. Conventionally, this has been done by turning or moving the total station with the same angular velocity as before the target was lost. However, this in fact corresponds to a target moving along a circle around the total station, which is an uncommon case. In most cases, the target moves along a linear or slightly curved path, which not necessarily is perpendicular to the line of sight of the total station. A target moving with constant speed along a linear path relative the total station will not have a constant angular velocity. The angular velocity will, for example, increase significantly in the vicinity of the total station, especially when the target passes close to the total station.

A similar problem arises in the distance meter, which uses a pulse measurement technique where the exact time a transmitted pulse returns from the target is determined. The distance meter utilizes a narrow sampling window, i.e. a short period of time, which entails that it is able to sample only a short period of time for each returning pulse. Consequently, in order to obtain measurement data from a certain returning pulse, the distance meter must know approximately when it will be returning. Since the time of flight corresponds to the distance to the target this means that the distance meter has to know the approximate distance to the target.

When measuring against an unknown target, the distance meter will move the sampling window and search for the returning pulse, which make take time. Once the target has been found, the distance meter will keep the sampling window locked and will start shifting or moving the sampling window if the target starts moving to compensate for the distance change. If the measuring signal has been obstructed for some reason, for example, due to that the target is hidden temporarily behind an obstacle, the distance meter may loose the target, i.e. the sampling window may not capture the returning. In order to resume the distance measuring procedure, the distance meter have to estimate the distance to the target when it reappears after the obstacle, which may be difficult due to, for example, a non-linear moving velocity of the object. Accordingly, the distance meter may have to search for the returning pulse and move the sampling window, which may take time.

Thus, there is need of an improved and more efficient total station and a method for such a total station for estimating, for example, a position of a moving object.

SUMMARY OF THE PRESENT INVENTION

An object of the present invention is to provide an improved measuring instrument and a method for such an instrument for estimating a position of a moving object.

Another object of the present invention is to provide an improved and more efficient measuring instrument and a method for such an instrument for tracking a moving object.

A further object of the present invention is to provide an improved and more efficient measuring instrument and a method for such an instrument for measuring the distance to an object.

A further object of the present invention is to provide an improved measuring instrument and a method for such an instrument for regaining lock to a target after the target has been lost during a measurement session in fast and efficient manner.

These and other objects of the present invention are achieved by a method, a measuring instrument and a computer program product having the features defined in the independent claims. Certain embodiments are characterized by the dependent claims.

In order to clarify, the term "total station" used herein refers to a distance measuring instrument with an integrated distance and angular measurement, i.e. with combined electronic, optical and computer techniques. Such an instrument gives both the distance as well as the vertical and horizontal direction towards a target, whereby the distance is measured against an object or target such as a reflector. The term "total station" as used herein includes the following terms: survey unit, or geodetic instrument.

According to an aspect of the present invention, a method for a measuring instrument comprising a position calculating circuit including a tracker and a servo system, an angle measuring system and a distance measuring system for sending out measuring beams for distance and angle measurements and for receiving reflected beams during measurement sessions, the angle measuring system being adapted to calculate position data including at least horizontal and vertical angle between the measuring instrument and a target using the measuring beams and reflecting beams. The method includes the steps of: obtaining sets of target position data including at least horizontal and vertical angle between the measuring instrument and the at least one target in consecutive measurements during a measurement session, calculating a model describing a path of and/or a distance to the target based on at least one data set obtained at a preceding measurement, the model predicting positions of the target, estimating at least a present position of the target and/or at least a present distance to the target using the calculated model, and, at initiation of a new measurement session, using the estimated position of the target when searching for the target.

According to a second aspect of the present invention, there is provided a measuring instrument comprising a position calculating circuit including a tracker and a servo system, an angle measuring system and a distance measuring system for sending out measuring beams for distance and angle measurements and for receiving reflected beams during measurement sessions, the angle measuring system being adapted to calculate position data including at least horizontal and vertical angle between the measuring instrument and a target using the measuring beams and reflecting beams. The measuring instrument further comprises a target predicting system adapted to obtain sets of target position data including at least horizontal and vertical angle between the measuring instrument and the at least one target in consecutive measurements during a measurement session, wherein the target predicting system includes a state estimator adapted to calculate a model describing a path of and/or a distance to the target based on at least one data set obtained at a preceding measurement. The model predicts positions of the target. The target predicting system further comprises a target predictor adapted to estimate at least a present position of the target and/or at least a present distance to the target using the calculated model. The position calculating system is adapted to, at initiation of a new measurement session, use the estimated position of the target when searching for the target.

According to a further aspect of the present invention, there is provided a computer program product, directly loadable into an internal memory of measuring instrument, comprising software code portions for causing the measuring instrument to perform steps in accordance with the method according to the first aspect of the present invention.

Hence, the present invention is based on the idea of creating a model of the motion of a target or object based on measured angles and measured distance to the target. When a target is lost due to, for example, that the measuring beam is obstructed, the distance measuring system and the tracker and servo system may use this model to estimate where the target will be at a future time point, i.e. estimate the distance and angles to the target. Thereby, the distance measuring system and the tracker and servo system will have a good approximation of the position of the target and may thus start searching for the target with this approximate position as a first guess.

The present invention provides several advantages in comparison to the known prior art, for example, when the target is temporarily lost, i.e. the reflecting signal is lost, when the target for instance is momentarily hidden behind an obstacle. In order to regain the lock of the target when the target reappears, the measuring instrument needs to estimate the movement of the target behind the obstacle. Conventionally, this is done by turning or moving the measuring instrument with the same angular velocity as before the target was lost. However, this in fact corresponds to a target moving along a circle around the measuring instrument, which is an uncommon case. In most cases, the target moves along a linear or slightly curved path, which not necessarily is perpendicular to the line of sight of the measuring instrument. The present invention allows the measuring instrument to regain lock to a moving target with, for example, constant speed along a linear path relative the measuring instrument that have a angular velocity that is not constant significantly faster in comparison to the known prior art. This can be done due to the fact that the calculated model describing the path take into account the horizontal and vertical angle and the distance to the target.

In an embodiment of the present invention, the distance measuring system is adapted to calculate position data including at least distance between the measuring instrument and the target using the measuring beams and reflecting beams, and wherein the target predicting system is adapted to obtain sets of target position data including at least horizontal and vertical angle, and distance between the measuring instrument and the at least one target in the consecutive measurements.

Furthermore, the distance measuring system utilizes a narrow sampling window, i.e. a short period of time, which entails that it is able to sample only a short period of time for each returning pulse. Consequently, in order to obtain measurement data from a certain returning pulse, the distance measuring system must know approximately when it will be returning according to the prior art methods. Since the time of flight corresponds to the distance to the target this means that the distance measuring system has to know the approximate distance to the target. When measuring against an unknown target, the distance measuring system will move the sampling window and search for the returning pulse, which make take time. Once the target has been found, the distance measuring system will keep the sampling window locked and will start shifting or moving the sampling window if the target starts moving to compensate for the distance change. If the measuring been is obstructed for some reason, for example, due to that the target is hidden temporarily behind an obstacle, the distance measuring system may loose the target, i.e. the sampling window may not capture the returning pulse. In order to resume the distance measuring procedure, the distance measuring system have to estimate the distance to the target when it reappears after the obstacle, which may be difficult due to, for example, a non-linear moving velocity of the target. According to the present invention, the distance measuring system uses the predicted position determined by the calculated model of the path of the target to estimate the distance to the target. Accordingly, the distance measuring system will have a good estimate where to search for the returning pulse and how to move the sampling window and may thus find the target in a significantly short period of time in comparison with the prior art methods.

In another embodiment of the present invention, the target prediction is used in connection with a phase measuring instrument.

In accordance to an embodiment of the present invention, the target prediction system comprises a spherical to Cartesian transformation circuit connected to the state estimator circuit, Furthermore, the state estimator circuit is connected to a target predictor, which in turn, is connected to an internal clock of, for example, the control circuit and a Cartesian to spherical transformation circuit. The angle measuring system measures the horizontal angle, the vertical angle, and distance measuring system measures the distance to a moving target. A position vector in spherical coordinates may thus be fed to the spherical to Cartesian transformation circuit, which position is transformed to a Cartesian coordinate system by the spherical to Cartesian transformation circuit. The position in Cartesian coordinates is subsequently fed to the state estimator that estimates the motion of the target and produces a target state vector containing at least an estimated position and speed in three dimensions. The vector may, for example, also contain acceleration data related the target in three dimensions. This vector is supplied to the target predictor, which is adapted to calculate a position of the target using the received state vector and a time received from an internal clock. The vector containing the predicted position is then supplied to the position calculation system for use if the target is lost.

According to an embodiment of the present invention, the state vector is a Kalman filter, i.e. a recursive estimator. Only the estimated state from the previous time step and the current measurement are used to compute the estimate for the current state.

According to an embodiment of the present invention, each new measured target position data set is feed into the model. Thereby, the model is updated regularly.

In a further embodiment of the present invention, a check is performed regularly, for example, at each measurement, whether a deviation between a present position of the target and a position predicted with the model exceeds a predetermined limit and if the limit is exceeded, a new model based on the last measurement values is calculated.

According to a further embodiment, the distance measuring system may use the prediction model during a tracking mode, i.e. continuous movement of the tracker and servo system.

According to yet another embodiment of the present invention, the prediction model is used in case where the measuring system performs measurement against more than one target. For example, in a case where the measuring system measures against two moving targets. The prediction model can in such a case be utilized in that when the instrument shifts from a first target, which have been tracker for a while and for which a prediction model has been calculated, to a second target, the prediction model for the first target is saved and may thus be used to predict the movement of the first target during measurements against the second target. Thereby, it is possible to fast regain lock to the first target again after a shift from the second target back to the first object since the prediction model was saved and used to predict the position for the first target.

In yet another embodiment of the present invention, the signal strength of, for example, the tracker and servo system is used to estimate a distance, for example, if the target has been lost so long that the model is not valid anymore. The signal strength depends on several parameters, for instance weather conditions, type of target and the distance to the target. All parameters except for the distance to the target can be assumed to vary quite slowly. If the signal strength is fed into the model together with the horizontal and vertical angle and the distance, it can be correlated to the distance and the influence of all other parameters can be determined. When the tracker and servo system has found the target again after a target has been lost, the signal strength can be used in the model to estimate the distance to the target and the distance measuring system can use the signal strength when searching for the target.

As realized by the person skilled in the art, steps of the methods of the present invention, as well as preferred embodiment thereof, are suitable to realize as a computer program or a computer readable medium.

The features that characterize the invention, both as to organization and to method of operation, together with further objects and advantages thereof, will be better understood from the following description used in conjunction with the accompanying drawings. It is to be expressly understood that the drawings is for the purpose of illustration and description and is not intended as a definition of the limits of the invention. These and other objects attained, and advantages offered, by the present invention will become more fully apparent as the description that now follows is read in conjunction with the accompanying drawings.

BRIEF DESCRIPTION OF THE DRAWINGS

In the following detailed description, reference will be made to the accompanying drawings, of which.

DETAILED DESCRIPTION OF THE PRESENT INVENTION

Figure 1:
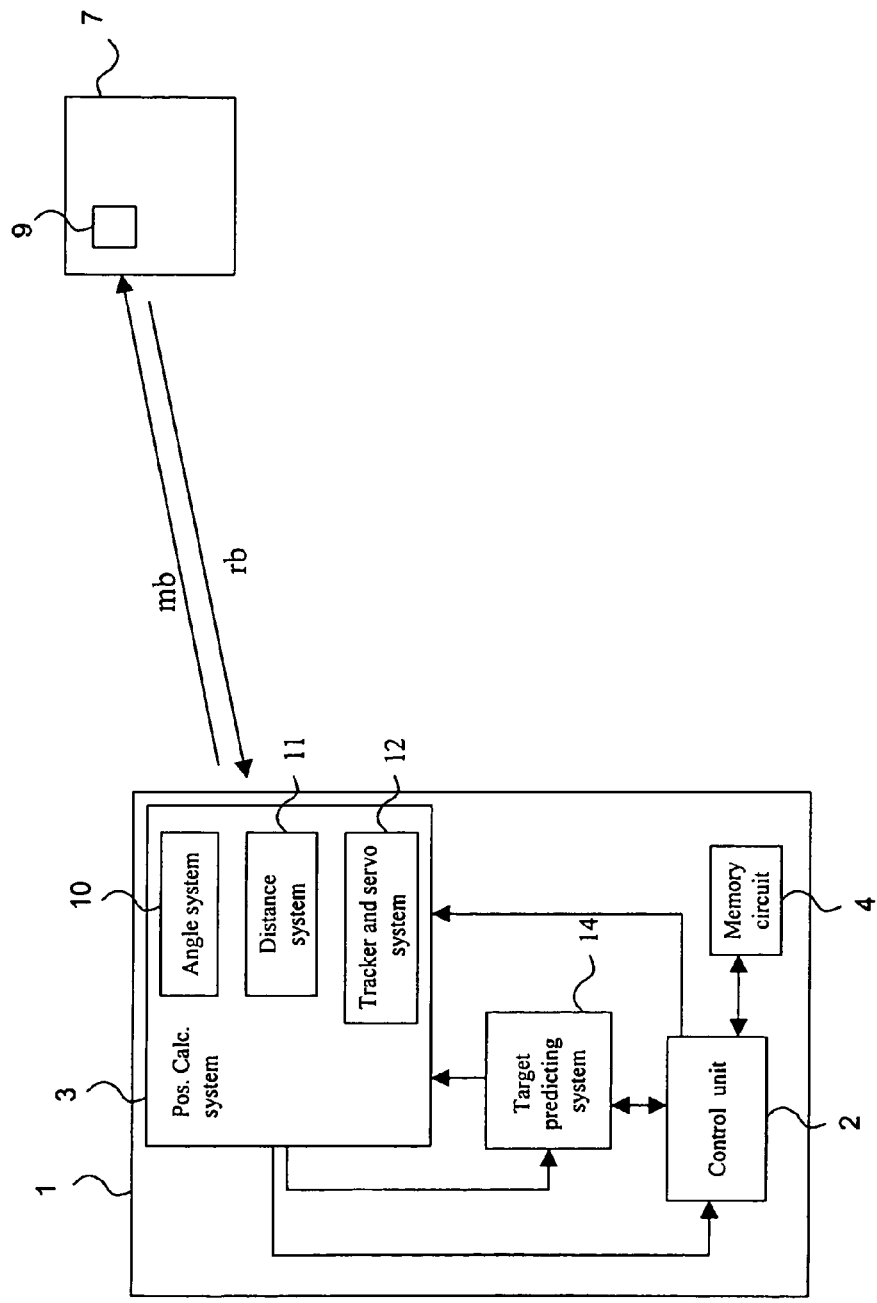
FIG. 1 schematically shown a measuring instrument according to the present invention and a target.

With reference first to FIG. 1, an embodiment of a measuring instrument, such as a total station or a geodetic instrument, according to the present invention will be discussed.

The total station is a distance measuring instrument with an integrated distance and angular measurement, i.e. with combined electronic, optical and computer techniques. Such a total station gives both the distance as well as the vertical and horizontal direction towards an object or a target, whereby the distance is measured against a reflecting surface or a reflector, e.g. of the corner cube type. A total station is furthermore provided with a computer or control unit with writable information for measurements to be performed and for storing data obtained during the measurements. Preferably, the total station calculates the position of a target in a fixed ground-based coordinate system. In, for example, WO 2004/057269 by the same applicant, such a total station is described in more detail.

Embodiments of the present invention will now be described in connection with a total station.

According to the present invention, the measuring instrument or total station 1 includes a control unit 2, including a control logic, and a position calculation circuit 3 including arrangements for sending out measuring beams mb for distance and alignment measurements and sensor arrangements for receiving reflected beams rb from target 9 of an object 7 or an individual target. In one embodiment, the position calculation circuit 3 comprises an angle measuring system 10 adapted to measure a horizontal angle (Ha) to the target 9 and a vertical angle (Va) to the target 9.

Further, the position calculation circuit 3 comprises a distance measuring system 11 adapted to measure the distance d to the target 9 and a tracker and a servo system 12 adapted to control the movement of the total station 1 and to aim at the target 9 based on target position information from, for example, earlier measurements. The position of the target is obtained in spherical coordinates (Ha, Va, d).

Moreover, the total station 1 comprises a memory circuit 4, which memory circuit 4 may include a random access memory (RAM) and/or a non-volatile memory such as a read-only memory (ROM).

Figure 2:
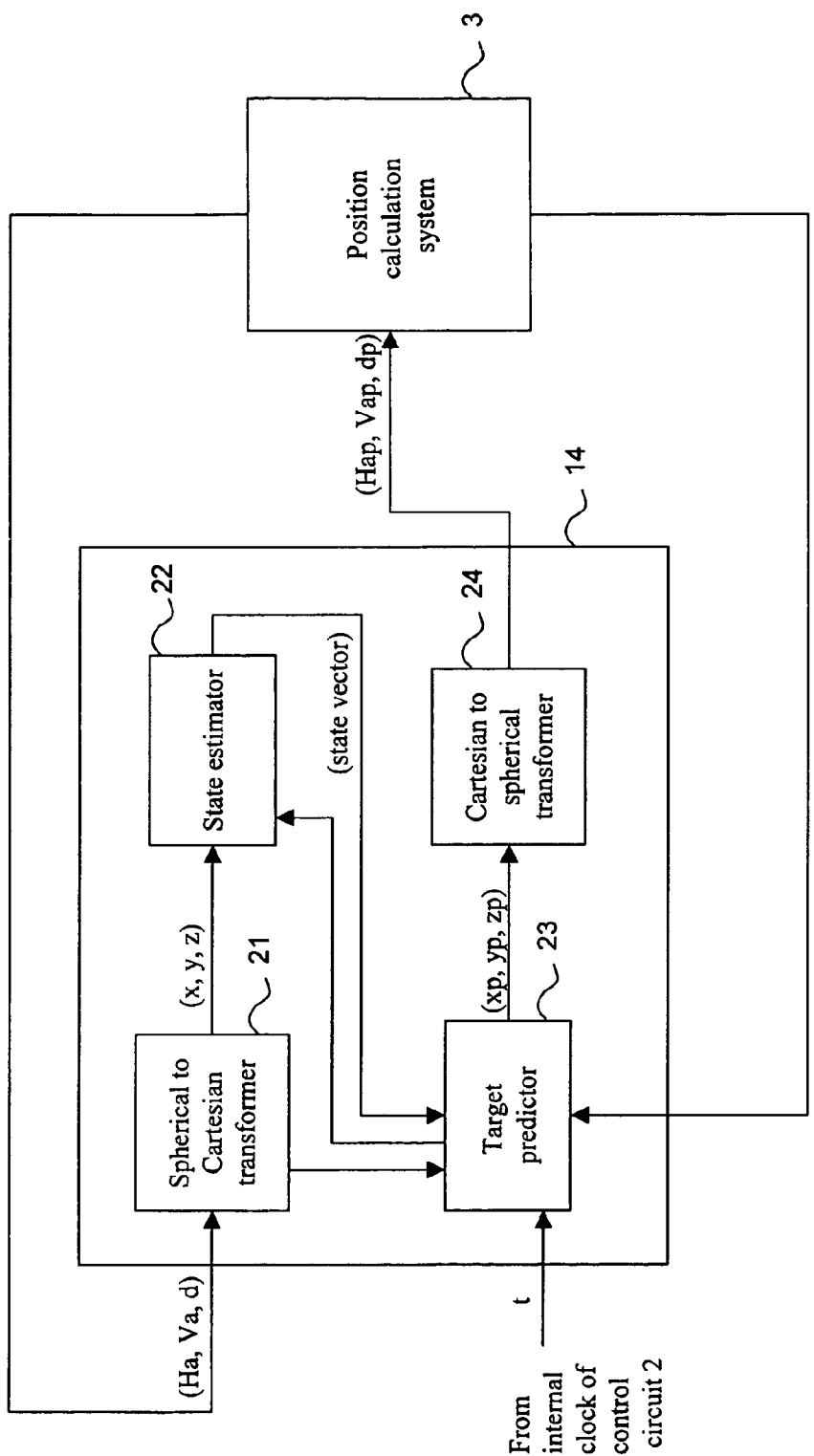
FIG. 2 schematically shown a target prediction system and a positioning calculation system according an embodiment of the present invention.
Figure 3:
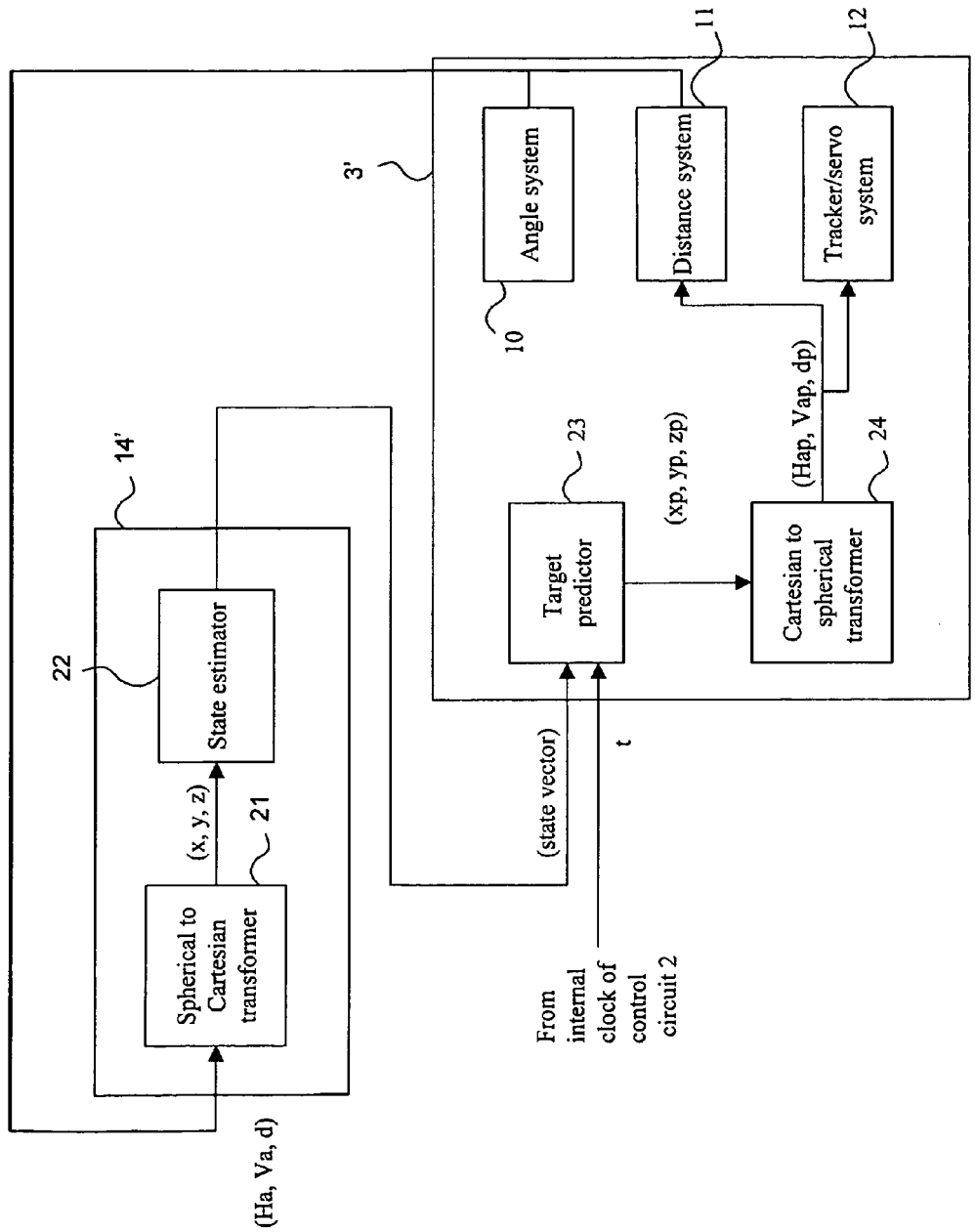
FIG. 3 schematically shown a target prediction system and a positioning calculation system according an further embodiment of the present invention.

The target prediction system 14, which will be described in more detail below with reference to FIGS. 2 and 3, is adapted to determine a model that predicts a position of the target 9 based on earlier measurements of at least the horizontal angle Ha, the vertical angle Va, and the distance d. In case the target is lost during a measurement session, the position calculation system 3 may use a prediction of the position of the target 9 calculated from the model.

Furthermore, the total station 1 may comprise a display (not shown) for presenting information visually for a user by means of a graphical user interface (GUI) and an input device (not shown), for example, a keyboard, which enable a user to, for example, input information and commands.

Turning now to FIG. 2, an embodiment of a target prediction system according to the present invention will be described. The target prediction system 14 comprises a spherical to Cartesian transformation circuit 21 connected to a state estimator circuit 22, which in one embodiment is a so called Kalman filter. A Kalman filter is a recursive estimator. This means that only the estimated state from the previous time step and the current measurement are needed to compute the estimate for the current state. In contrast to batch estimation techniques, no history of observations and/or estimates is required. It is a time domain filter. Furthermore, the state estimator circuit 22 is connected to a target predictor 23, which in turn, is connected to an internal clock of the control circuit 2 and a Cartesian to spherical transformation circuit 24. However, alternatively, the target predictor may use an internal clock of a RF unit of the total station 1.

In operation, the angle measuring system 10 measures the horizontal angle Ha, the vertical angle Va, and distance measuring system 11 measures the distance d to a moving target. It should be noted that in embodiments of the present invention, only the horizontal angle Ha and the vertical angle Va are used for the calculation of the prediction model. The distance can be estimated in different ways, for example, it may be approximated that an object moves along a straight line. A position vector (Ha, Va, d) in spherical coordinates may thus be fed to the spherical to Cartesian transformation circuit 21. This position is transformed to a Cartesian coordinate system (x, y, z) by the spherical to Cartesian transformation circuit 21. The position in Cartesian coordinates is fed to the state estimator 22 that estimates the motion of the target. The state estimator 22 produces a target state vector containing at least an estimated position and speed in three dimensions (x, dx/dt, y, dy/dt, z, dz/dt). The vector may, for example, also contain acceleration of the target in three dimensions. This vector is supplied to the target predictor 23 that is adapted to calculate a position of the target using the received state vector and a time received from an internal clock. The calculated position is in this case:

$$xp=x0+dx/dt*t$$

$$yp=y0+dy/dt*t$$

$$zp=z0+dz/dt*t,$$

where (x0, y0, z0) is the starting point from the preceding state vector. Accordingly, the predicted position (xp, yp, zp) is starting point from the preceding state vector calculated forward in time t using the speed vector elements from the present state vector.

According to one embodiment of the present invention, a predicted position is calculated at predetermined intervals and is sent to the Cartesian to spherical transformation circuit 24, which transforms the predicted coordinates (xp, yp, zp) to a predicted position in spherical coordinates (Hap, Vap, dp). The vector comprising the predicted position is then supplied to the position calculation system 3 for use if the target is lost.

In another embodiment of the present invention, a predicted position is calculated if the target predictor receives a message from the position calculation system 3 that the target has been lost. Then, the predicted position is calculated and sent to the Cartesian to spherical transformation circuit 24, which transforms the predicted coordinates (xp, yp, zp) to a predicted position in spherical coordinates (Hap, Vap, dp). The predicted vector is then supplied to the position calculation system 3, which uses the predicted position to guess where to start looking for the target.

The state vector is updated on a regular basis. According to one embodiment of the present invention, the state vector is updated each time the target prediction system 14 receives a new position vector (Ha, Va, d) from the angle measuring system 10 and the distance measuring system 11 of the position calculation circuit 3. In an alternative embodiment, the state vector is updated at predetermined intervals, for example, after a predetermined number of measurements of the horizontal angle Ha, the vertical angle Va, and the distance d to the target 9.

In a further embodiment, the prediction model is updated if the actual position has deviated too much, e.g. exceeds predetermined limits, from the predicted position calculated by means of the present model. For example, the target predictor 23 may be adapted to, for each received Cartesian position vector (x, y, z), calculate a position using the present state vector:

$$xp=x0+dx/dt*t$$

$$yp=y0+dy/dt*t$$

$$zp=z0+dz/dt*t$$

The predicted position is compared with the present position (x, y, z) according to the following:

$$|xp-x| \leq x_{lim\,it}$$

$$|yp-y| \leq y_{lim\,it}$$

$$|zp-z| \leq z_{lim\,it}$$

If these conditions are satisfied, i.e. a deviation between a present position and a predicted position is below a predetermined limit (−s), a new model is not calculated. On the other hand, if the deviation exceeds the predetermined limit (−s), a model is calculated using the present position data.

With reference now to FIG. 3, an alternative embodiment of the target prediction system and position calculation system will be described. Like parts in the target prediction system and position calculation system shown in FIG. 2 and FIG. 3 will be denoted with the same reference numerals and description thereof will be omitted since they have been described above with reference to FIG. 2. According to this embodiment, the target prediction system 14' comprises the spherical to Cartesian transformation circuit 21 and the state estimator circuit 22. The position calculation system 3' comprises the target predictor 23 and the Cartesian to spherical transformation circuit 24 in addition to the angle measuring system 10, the distance measuring system 11 and the tracker system 12.

In operation, the angle measuring system 10 measures the horizontal angle Ha, the vertical angle Va, and distance measuring system 11 measures the distance d to a moving target. A position vector (Ha, Va, d) in spherical coordinates may thus be fed to the spherical to Cartesian transformation circuit 21. This position is transformed to a Cartesian coordinate system (x, y, z) by the spherical to Cartesian transformation circuit 21. The position in Cartesian coordinates is fed to the state estimator 22 that estimates the motion of the target. The state estimator 22 produces a target state vector containing at least an estimated position and speed in three dimensions (x, dx/dt, y, dy/dt, z, dz/dt). The vector may, for example, also contain acceleration of the target in three dimensions.

This vector is supplied to the position calculation system 3' and the target predictor 23, which calculates the position according to:

$$xp=x0+dx/dt*t$$

$$yp=y0+dy/dt*t$$

$$zp=z0+dz/dt*t,$$

where (x0, y0, z0) is the starting point from the preceding state vector. Accordingly, the predicted position (xp, yp, zp) is starting point from the preceding state vector calculated forward in time t using the speed vector elements from the present state vector.

According to one embodiment of the present invention, a predicted position is calculated at predetermined intervals and is sent to the Cartesian to spherical transformation circuit 24, which transforms the predicted coordinates (xp, yp, zp) to a predicted position in spherical coordinates (Hap, Vap, dp). The predicted vector is then supplied to the tracker system 12, the angle measuring system 10 and the distance measuring circuit for use if the target is lost.

In another embodiment of the present invention, a predicted position is calculated if the target predictor 23 receives a message from the tracker system 12 that the target has been lost. Then, the predicted position is calculated and sent to the Cartesian to spherical transformation circuit 24, which transforms the predicted coordinates (xp, yp, zp) to a predicted position in spherical coordinates (Hap, Vap, dp). The predicted vector is then supplied to the distance measuring system 11 and the tracker system 12, which use the predicted position to guess where to start looking for the target.

The state vector may be updated in accordance with the description above with reference to FIG. 2 or a new state vector may be calculated if a deviation is found to be too large.

Figure 4:
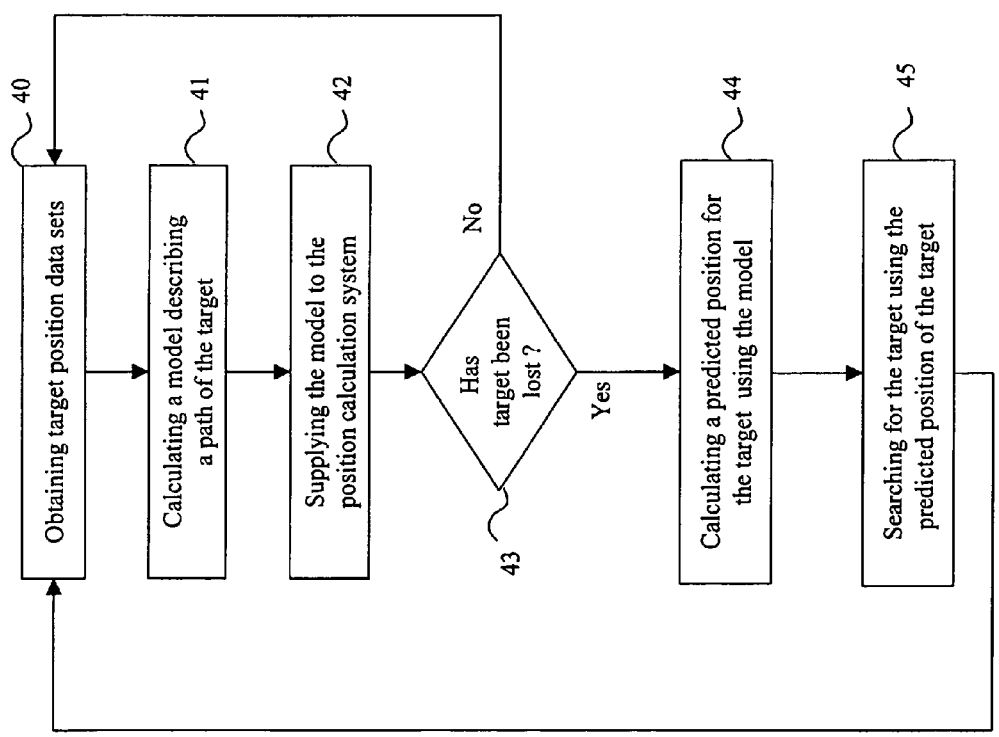
FIG. 4 shows a high-level flow chart of the method according to the present invention.

Referring now to FIG. 4, high-level description of the method according to the present invention will be give. First, at step 40, during a measurement session, the angle measuring system 10 and distance measuring system 11 measures the horizontal angle Ha, the vertical angle Va and the distance d to a target 9 at in consecutive measurements. The position of the target 9 is in spherical coordinates. Thus, sets of target position data including at least horizontal Ha and vertical angle Va and distance d between the measuring instrument 1 and the target 9 are obtained by the target prediction system 14. Then, at step 41, the position data is fed to the state estimator 22, where a model describing a path of and/or a distance to the target 9 based on at least one data set obtained at a preceding measurement occasion is calculated, which model predicts positions of the target 9. The state estimator 22 produces a model that describes a path of and/or a distance to the target 9 based on at least one data set obtained at a preceding measurement. Subsequently, at step 42, the model is sent to the position calculating system 3 and the distance measuring system 11 and the tracker and servo system 12. At step 43, it is checked whether the target has been lost during a predetermined period of time. If the target 9 has been lost, a present position of the target 9 will be estimated using the calculated model. At step 44, the predicted position is calculated in the target predictor 23 using the model. Thereafter, at step 45, the distance measuring system 11 and the tracker and servo system 12 are provided with the predicted position and are thus able to start looking for the target 9 using the predicted position as a first approximation. When the target has been found again, the algorithm returns to step 40 where the measurements can be resumed and measurement values, i.e. target position data sets, are obtained. If, in step 43, the target is not lost, the algorithm returns to step 40 where the tracking of the target is continued and measurement values, i.e. target position data sets, are obtained.

Figure 5:
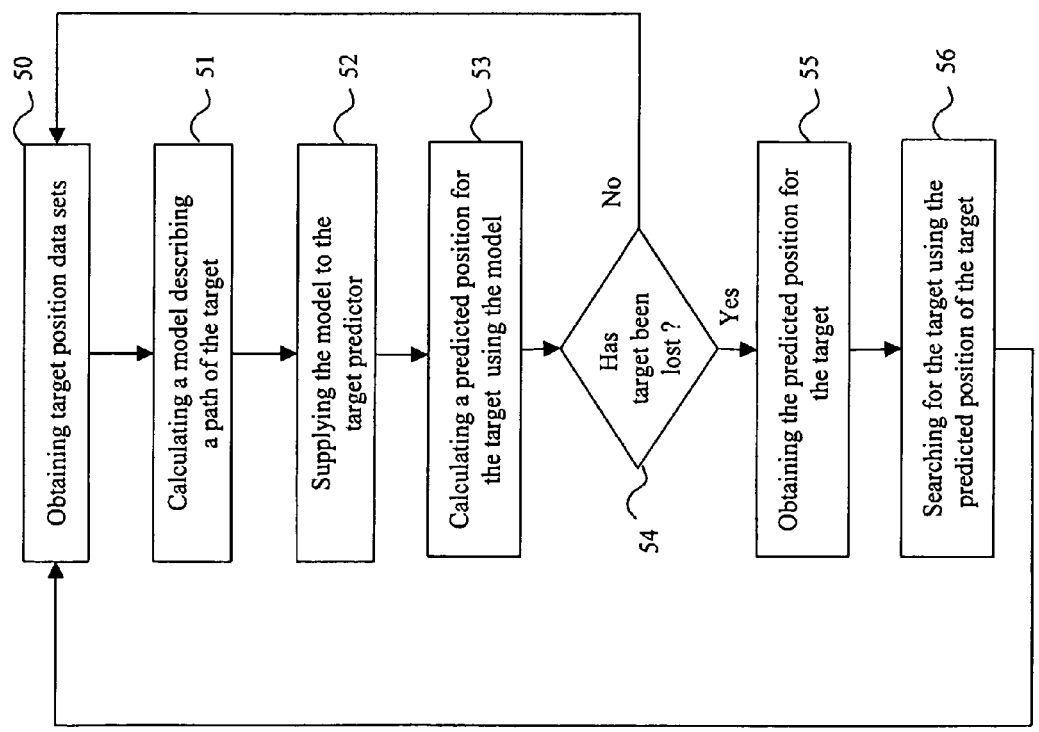
FIG. 5 shows a flow chart of an embodiment of the method according to the present invention.

Turning to FIG. 5, an embodiment of the present invention will be discussed with reference to FIG. 5. First, at step 50, during a measurement session, the angle measuring system 10 and distance measuring system 11 measures the horizontal angle Ha, the vertical angle Va and the distance d to a target 9 in consecutive measurements. The position of the target 9 is in spherical coordinates. Thus, sets of target position data including at least horizontal Ha and vertical angle Va and distance d between the measuring instrument 1 and the target 9 are obtained by the target prediction system 14. Then, at step 51, the position data is fed to the state estimator 22 where a model describing a path of and/or a distance to the target 9 based on at least one data set obtained at a preceding measurement occasion is calculated, which model predicts positions of the target 9. The state estimator 22 produces a model that describes a path of and/or a distance to the target 9 based on at least one data set obtained at a preceding measurement. Subsequently, at step 52, the model is sent to the position calculating system 3 and the distance measuring system 11 and the tracker and servo system 12. At step 54, the predicted position is calculated in the target predictor 23 using the model. At step 55, it is checked whether the target has been lost during a predetermined period of time. If the target 9 has been lost, the predicted position is obtained by the distance measuring system 11 and the tracker and servo system 12 and are thus able to start looking for the target 9 using the predicted position as a first approximation at step 56. When the target has been found again, the algorithm returns to step 50 where the measurements are resumed and measurement values, i.e. target position data, sets are obtained in consecutive measurements. If, in step 54, the target is not lost, the algorithm returns to step 50 where the tracking of the target is continued and measurement values, i.e. target position data sets, are obtained.

Figure 6:
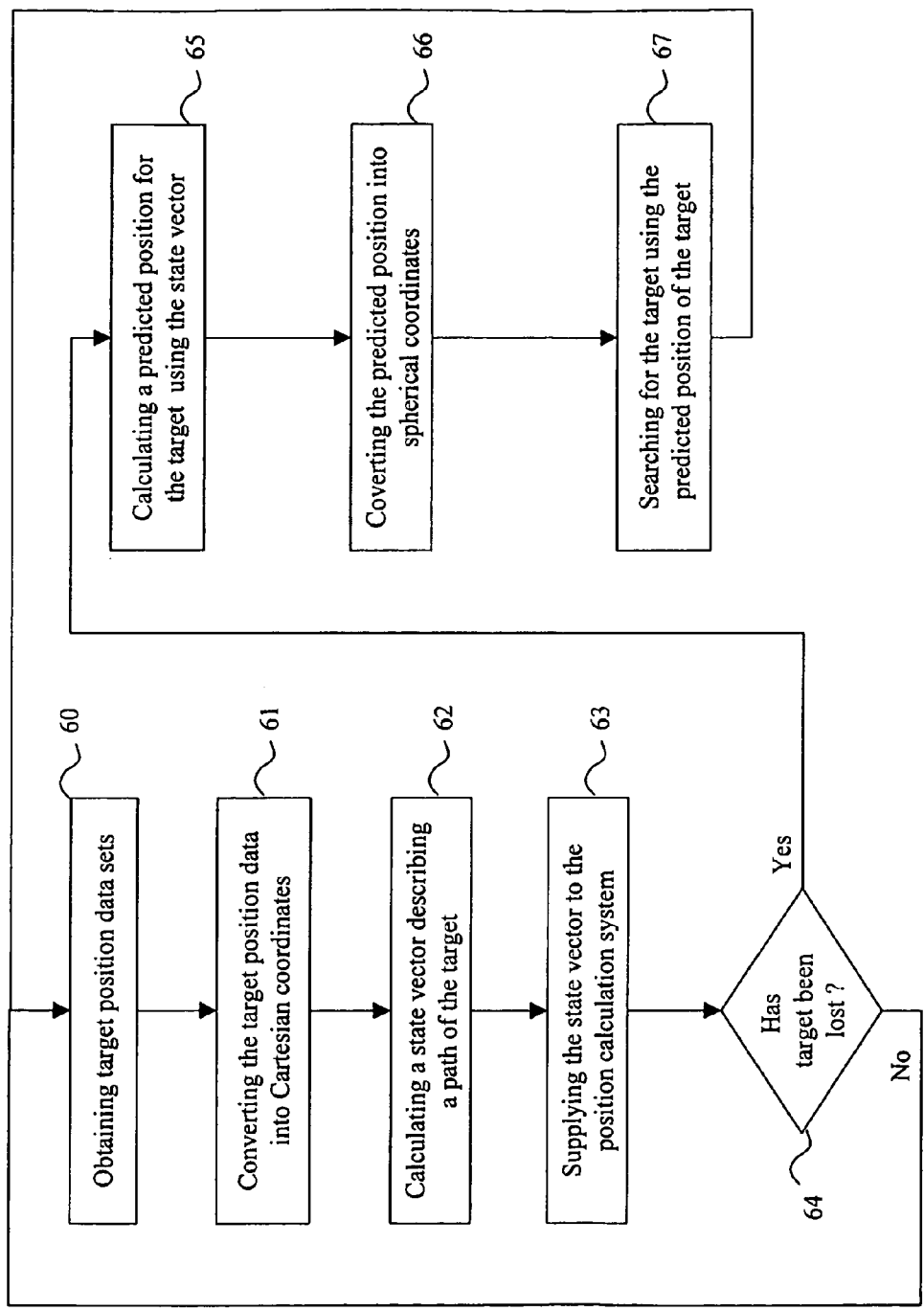
FIG. 6 shows a flow chart of a further embodiment of the method according to the present invention.

With respect to FIG. 6, a further embodiment of the method according to the present invention for prediction of a position of a moving target will be discussed. During a measurement session, the angle measuring system 10 and distance measuring system 11 measures the horizontal angle Ha, the vertical angle Va and the distance d to a target 9 in consecutive measurements. The position of the target 9 is in spherical coordinates. First, at step 60, sets of target position data including at least horizontal Ha and vertical angle Va and distance d between the measuring instrument 1 and the target 9 are obtained by the target prediction system 14. At step 61, the obtained target position data (Ha, Va, d) is fed to a spherical to Cartesian transformer 21, where the spherical position data is converted to a Cartesian coordinate system (x, y, z). Then, at step 62, the position data (x, y, z) is fed to the state estimator 22 where a model describing a path of and/or a distance to the target 9 based on at least one data set obtained at a preceding measurement occasion is calculated, which model predicts positions of the target 9. The state estimator 22 produces a state vector which comprises an estimated position of the target 9 and the velocity of the target 9 in three dimensions (x, dx/dt, y, dy/dt, z, dz/dt). Subsequently, at step 63, the state vector is sent to the position calculating system 3 and the distance measuring system 11 and the tracker and servo system 12. At step 64, it is checked whether the target has been lost during a predetermined period of time, e.g. if the tracker and servo system 12 do not receive a reflecting beam during the predetermined period. If the target 9 has been lost, a present position of the target 9 will be estimated using the calculated model. At step 65, the predicted position (xp, yp, zp) is calculated in the target predictor 23 using the state vector, where the predicted position from the preceding or last state is used as starting point and the present point of time t is used in the velocity vector as discussed above. Then, at step 66, the predicted position is sent to the Cartesian to spherical transformer 24 for conversion to spherical coordinates (Hap, Vap, dp). Thereafter, at step 67, the distance measuring system 11 and the tracker and servo system 12 are provided with the predicted position and are thus able to start looking for the target 9 using the predicted position as a first guess. When the target has been found again, the algorithm proceeds to step 60 where the measurements are resumed and measurement values, i.e. target position data sets, are obtained in consecutive measurements. If, in step 63, the target is not lost, the algorithm returns to step 60 where the tracking of the target is continued and measurement values, i.e. target position data sets are obtained.

Figure 7:
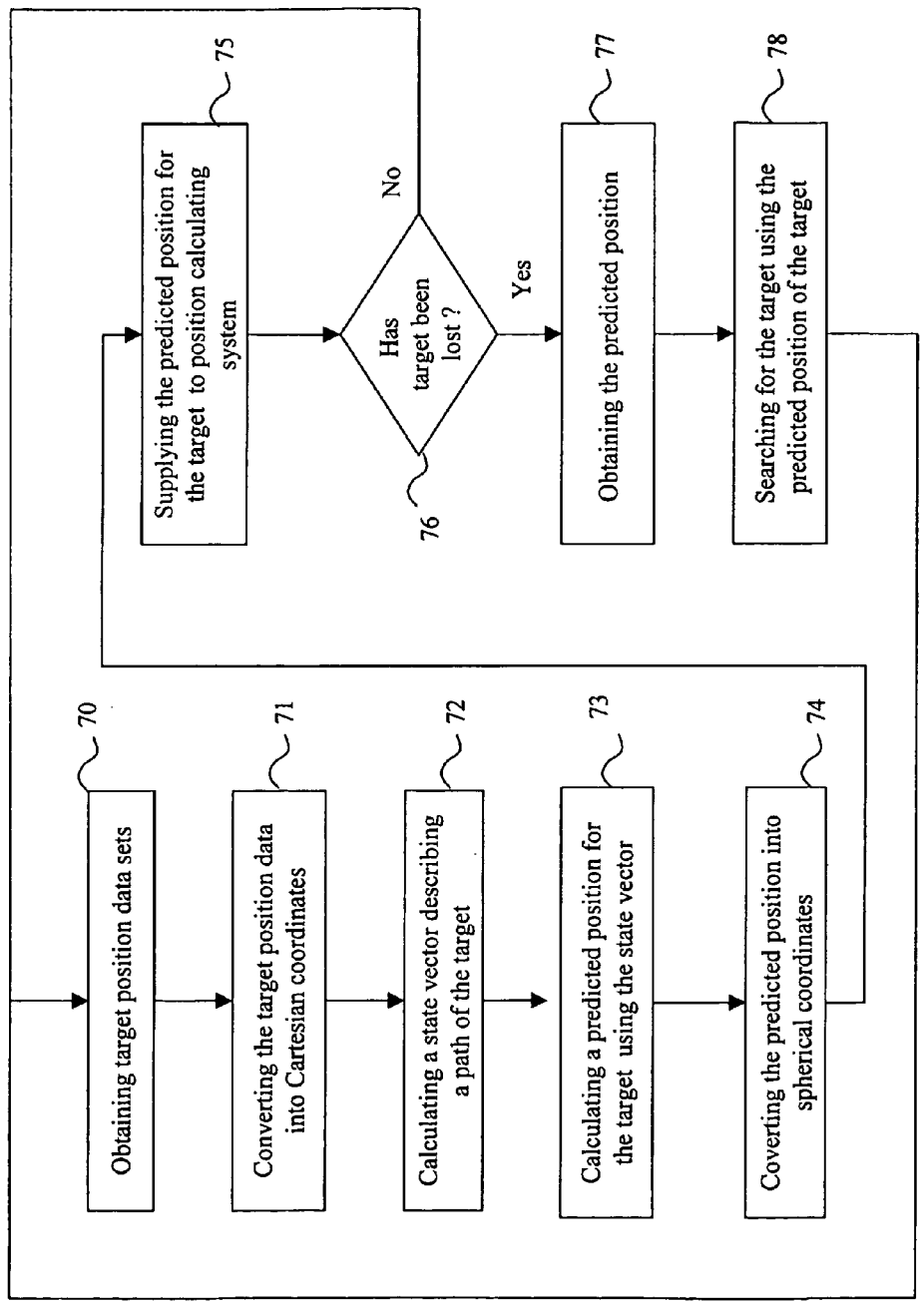
FIG. 7 shows a flow chart of yet another embodiment of the method according to the present invention.

With reference to FIG. 7, a yet another embodiment of the method according to the present invention for prediction of a position of a moving target will be discussed. During a measurement session, the angle measuring system 10 and distance measuring system 11 measures the horizontal angle Ha, the vertical angle Va and the distance d to a target 9 in consecutive measurements. The position of the target 9 is in spherical coordinates. First, at step 70, sets of target position data including at least horizontal Ha and vertical angle Va and distance d between the measuring instrument 1 and the target 9 are obtained by the target prediction system 14. At step 71, the obtained target position data (Ha, Va, d) is fed to a spherical to Cartesian transformer 21, where the spherical position data is converted to a Cartesian coordinate system (x, y, z). Then, at step 72, the position data (x, y, z) is fed to the state estimator 22 where a model describing a path of and/or a distance to the target 9 based on at least one data set obtained at a preceding measurement occasion is calculated, which model predicts positions of the target 9. The state estimator 22 produces a state vector which comprises an estimated position of the target 9 and the velocity of the target 9 in three dimensions (x, dx/dt, y, dy/dt, z, dz/dt). At step 73, the predicted position (xp, yp, zp) is calculated in the target predictor 23 using the state vector, where the predicted position from the preceding or last state is used as starting point and the present point of time t is used in the velocity vector as discussed above. Then, at step 74, the predicted position is sent to the Cartesian to spherical transformer 24 for conversion to spherical coordinates (Hap, Vap, dp). Thereafter, at step 75, the distance measuring system 11 and the tracker and servo system 12 are provided with the predicted position. At step 76, it is checked whether the target has been lost during a predetermined period of time. If the target 9 has been lost, the predicted position is obtained by the distance measuring system 11 and the tracker and servo system 12 at step 77 and are thus able to start looking for the target 9 using the predicted position as a first approximation at step 78. When the target has been found again, the algorithm proceeds to step 70 where measurements are resumed and measurement values, i.e. target position data sets, are obtained in consecutive measurements. If, in step 76, the target is not lost, the algorithm returns to step 70 where the tracking of the target is continued and measurement values, i.e. target position data sets, are obtained.

According to a further embodiment, the distance measuring system 11 may use the prediction model during a tracking mode, i.e. continuous movement.

Although an exemplary embodiment of the present invention has been shown and described, it will be apparent to those having ordinary skill in the art that a number of changes, modifications, or alterations to the inventions as described herein may be made. Thus, it is to be understood that the above description of the invention and the accompanying drawings is to be regarded as a non-limiting example thereof and that the scope of protection is defined by the appended patent claims.

The invention claimed is:

1. A method for a measuring instrument comprising a position calculating circuit including a tracker and a servo system, an angle measuring system and an optical distance measuring system for sending out measuring beams including optical radiation for distance and angle measurements and for receiving reflected beams during measurement sessions, said angle measuring system being adapted to calculate target position data including at least horizontal and vertical angle between said measuring instrument and a target using said measuring beams and reflecting beams, the method comprising:

using the measuring instrument to,
  obtain sets of target position data including at least horizontal and vertical angle between said measuring instrument and said at least one target in consecutive measurements during a measurement session;
  calculate a model describing a path of and/or a distance to said target based on at least one data set obtained at a preceding measurement, said model predicting positions of said target;
  estimate at least a present position of said target and/or at least a present distance to said target using said calculated model;
  check whether said target has been lost, and if said target has been lost during a period of time, determine that said estimated position of said target and/or said estimated distance to said target is to be used in a search for said target; and
  use, at initiation of a new measurement session, said estimated position of said target when searching for said target.

2. The method according to claim 1, wherein said distance measuring system is adapted to calculate target position data including at least distance between said measuring instrument and said target using said measuring beams and reflecting beams, wherein said using the measuring instrument to obtain sets of target position data includes obtaining sets of target position data including at least horizontal and vertical angle, and distance between said measuring instrument and said at least one target in said consecutive measurements.

3. The method according to claim 1, wherein the using the measuring instrument to calculate a model describing a path of and/or a distance to said target comprises:
  using the measuring instrument to determine a state vector comprising at least a preceding position of said target and a velocity of said target based on sets of target position data including at least horizontal and vertical angle and/or distance between said measuring instrument and said target, said data sets being obtained during at least one preceding measurement.

4. The method according to claim 3, wherein the using the measuring instrument to estimate at least a present position of said target and/or at least a present distance to said target using said calculated model further comprising:
using the measuring instrument to,
obtain a present time; and
calculate a present position of said target using said state vector and said present time.

5. The method according to claim 1, further comprising:
using the measuring instrument to,
convert said obtained target position data including at least horizontal and vertical angle and/or distance to Cartesian coordinates; and
determine a state vector comprising at least a preceding position of said target and a velocity of said target at said preceding position based on said converted Cartesian coordinates.

6. The method according to claim 5, further comprising:
using the measuring instrument to,
convert said estimated present position of said target defined in Cartesian coordinates into spherical coordinates comprising predicted horizontal and vertical angle and distance to said target; and
use said predicted position comprising horizontal and vertical angle and distance to said target when searching for said target when performing said new measurement session.

7. The method according to claim 1, further comprising:
using the measuring instrument to,
compare, at predetermined intervals, a set of target position data obtained at a last measurement with a predicted present position of said target; and
calculate a new model using at least said last obtained set of target data if a deviation between said last obtained set of target position data and said predicted position exceeds a predetermined limit.

8. The method according to claim 1, further comprising:
using the measuring instrument to update said model each time a new set of target position data is obtained.

9. The method according to claim 1, wherein said predicted position is obtained when said position calculation circuit has failed to find reflecting beams from said target during a predetermined period of time during a measurement session.

10. The method according to claim 1, wherein said a model describing a path of and/or a distance to said target based on at least one data set obtained at a preceding measurement occasion, comprises:
using the measuring instrument to perform recursive estimation, wherein the estimated position of said target and the current measured target position data is used.

11. The method according to claim 1, wherein the using the measuring instrument to obtain sets of target position data includes obtaining signal strength of said at least one target during said consecutive measurements;
the using the measuring instrument to calculate a model describing a path of and/or a distance to said target based on at least one data set includes the signal strength obtained at a preceding measurement, said model predicting positions of said target;
the using the measuring instrument to estimate a present distance to said target using said calculated model includes the signal strength, and the method further comprising;

using the measuring instrument to use, at initiation of a new measurement session, said estimated distance to said target when searching for said target.

12. A measuring instrument comprising a position calculating circuit including a tracker and a servo system, an angle measuring system and an optical distance measuring system for sending out measuring beams comprising optical radiation for distance and angle measurements and for receiving reflected beams during measurement sessions, said angle measuring system being adapted to calculate target position data including at least horizontal and vertical angle between said measuring instrument and a target using said measuring beams and reflecting beams, comprising:
a target predicting system adapted to obtain sets of target position data including at least horizontal and vertical angle between said measuring instrument and said at least one target in consecutive measurements during a measurement session;
said target predicting system comprising a state estimator adapted to calculate a model describing a path of and/or a distance to said target based on at least one data set obtained at a preceding measurement, said model predicting positions of said target; said target predicting system comprising a target predictor adapted to estimate at least a present position of said target and/or at least a present distance to said target using said calculated model;
wherein said position calculating system is adapted to check whether said target has been lost during a period of time, and wherein said position calculating system is adapted to determine, that said estimated position of said target and/or said estimated distance to said target is to be used in a search for said target if said target has been lost; and
wherein said position calculating system is adapted to, at initiation of a new measurement session, use said estimated position of said target when searching for said target.

13. The measuring instrument according to claim 12, wherein said distance measuring system is adapted to calculate target position data including at least distance between said measuring instrument and said target using said measuring beams and reflecting beams, and wherein said target predicting system is adapted to obtain sets of target position data including at least horizontal (Ha) and vertical angle, and distance between said measuring instrument and said at least one target in said consecutive measurements.

14. The measuring instrument according to claim 12, wherein said state estimator is adapted to determine a state vector comprising at least a preceding position of said target and a velocity of said target based on sets of target position data including at least horizontal and vertical angle and/or distance between said measuring instrument and said target, said data sets being obtained during at least one preceding measurement.

15. The measuring instrument according to claim 14, wherein said state estimator is adapted to
obtain a present time; and
calculate a present position of said target using said state vector and said present time.

16. The measuring instrument according to claim 12, wherein said target predicting system further comprises a spherical to Cartesian transformer adapted to convert said obtained target position data including at least horizontal and vertical angle and/or distance to Cartesian coordinates; and
wherein said state estimator is adapted to determine a state vector comprising at least a preceding position of said target and a velocity of said target at said preceding position based on said converted Cartesian coordinates.

17. The measuring instrument according to claim 16, wherein said target predicting system further comprises a Cartesian to spherical transformer adapted to convert said estimated present position of said target defined in Cartesian coordinates into spherical coordinates comprising predicted horizontal and vertical angle and distance to said target; and wherein said position calculation system is adapted to use said predicted position comprising horizontal and vertical angle and distance to said target when searching for said target when initiating said new measurement session.

18. The measuring instrument according to claim 12, wherein said target predictor is adapted to, at predetermined intervals, compare a set of target position data obtained at a last measurement with a predicted present position of said target; and wherein said state estimator is adapted to, if a deviation between said last obtained set of target position data and said predicted position exceeds a predetermined limit, calculate a new model using at least said last obtained set of target data.

19. The measuring instrument according to claim 12, wherein said state estimator is adapted to update said model each time a new set of target position data is obtained.

20. The measuring instrument according to claim 12, wherein said position calculating system is adapted to, when said position calculation circuit has failed to find reflecting beams from a target during a predetermined period of time during a measurement session, obtain said predicted position of said target from said target predictor.

21. The measuring instrument according to claim 12, wherein said state estimator comprises a Kalman filter adapted to use recursive estimation, wherein the estimated position of said target and the current measured target position data is used.

22. The measuring instrument according to claim 12, wherein said target predicting system is adapted to obtain sets of target position data including signal strength of a target in consecutive measurements during a measurement session;

said state estimator is adapted to calculate a model describing a path of and/or a distance to said target based on at least one data set including said signal strength obtained at a preceding measurement;

said target predictor is adapted to estimate at least present distance to said target using said calculated model; and wherein said position calculating system is adapted to, at initiation of a new measurement session, use said estimated distance to said target.

23. A computer program product, directly loadable into an internal memory of measuring instrument, comprising software code portions for causing said measuring instrument to perform the method in accordance with claim 1.

* * * * *